H. C. ALGER.
LIQUID METER.
APPLICATION FILED OCT. 10, 1912.
1,087,097.
Patented Feb. 17, 1914.
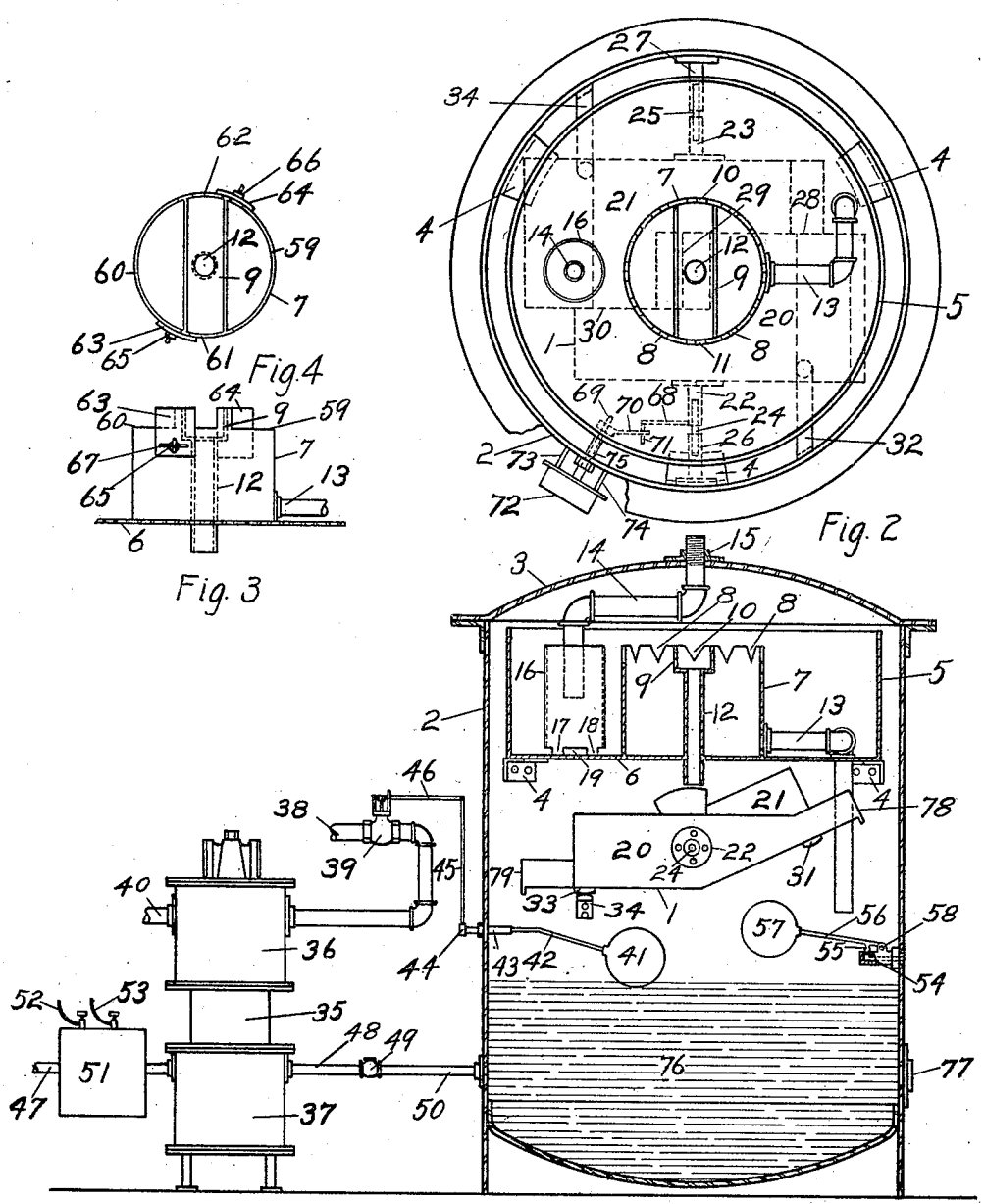

UNITED STATES PATENT OFFICE.

HARLEY C. ALGER, OF CHICAGO HEIGHTS, ILLINOIS.

LIQUID-METER.

1,087,097.  Specification of Letters Patent.  Patented Feb. 17, 1914.

Application filed October 10, 1912. Serial No. 724,981.

*To all whom it may concern:*

Be it known that I, HARLEY C. ALGER, a citizen of the United States, residing at Chicago Heights, in the county of Cook and State of Illinois, have invented new and useful Improvements in Liquid-Meters, of which the following is a specification.

My invention relates to improvements in liquid measuring or weighing devices whereby a weighing machine or measuring machine may be adapted to operate under pressure greater or less than atmospheric pressure, by providing a measuring or weighing element closed from communication to the atmosphere and by supplying such element with air or other fluid lighter than the liquid being measured so that the measuring element operates in an atmosphere of compressed or rarefied fluid.

One object of my invention is to produce a device of this character which, while measuring liquid accurately under a pressure different from atmospheric pressure, will occupy less floor space and head-room than devices constructed heretofore.

A further object is to provide a meter for measuring liquid under pressure which will receive, measure and deliver the liquid automatically, as required.

A still further object is to provide an automatic meter of this character which will not be subject to corrosion and which will do away with objectionable constituents which might be added to the liquid passing through the meter, thereby making a meter which will be substantial and resist wear.

In the accompanying drawing, Figure 1 shows a vertical sectional view of a meter with an automatically controlled air-compressor for supplying air thereto with means for removing the objectionable constituents in the air; Fig. 2 shows a plan view of the meter with cover removed; Fig. 3 shows a modification of the proportioning device which constitutes a part of the device shown in my invention while Fig. 4 shows a top plan view of the device shown in Fig. 3.

As shown in the accompanying drawing, my invention includes a measuring element 1 closed from communication to the atmosphere by any suitably constructed shell 2 which may have a cover 3 bolted or otherwise secured thereto, and closing the upper portion of the shell. Above the measuring element 1, suitably held as by lugs 4, 4 which may extend from the shell 2 is located a proportioning member which is adapted to accurately divide the stream of liquid, of which it is desired to ascertain the weight or volume. The proportioning member is adapted to deliver a definite proportion of the original stream to the measuring element 1 to be measured while a larger known proportion passes around the measuring element. Both of the divided streams then come together again so that the original amount of liquid is delivered from the meter and as the amount of the definite proportion, measured or weighed is known the whole amount of liquid delivered may be ascertained.

The proportioning member may be made in any desired manner and I do not wish to be understood as limiting myself to the exact construction set forth. In the drawing I have shown a proportioning member which consists of a suitably shaped liquid receiving tank or case 5 having a bottom 6. Within the case 5 is positioned a circular shell 7. In the upper edge of the circular shell 7 may be formed V-notches 8, 8 or other shaped weirs or orifices, the upper edge of the shell 7 being below the upper edge of the case 5, so that liquid delivered to the case 5 will flow over the weirs or orifices. A trough or other suitable means may be adapted to receive the liquid issuing from a portion of the notches or weirs, the trough 9 in the upper portion of the case 7 being shown in Figs. 1 and 2 adapted to receive any liquid passing through V-notches or weirs 10 and 11. A suitable pipe 12 is adapted to drain liquid from the trough 9 and deliver it through the bottom 6 of the case 5 to the measuring element 1, below. A suitable pipe 13 is adapted to drain the space within the circular shell 7 and leads the liquid, which may be delivered through the other V-notches or weirs 8, 8 to the interior of the shell 7 at the side of the measuring element 1, delivering this proportional but unmeasured liquid to the lower portion of the main shell 2 which constitutes a storage chamber 76 for liquid.

Any suitably arranged pipe 14, may carry liquid from a suitable inlet 15 to the case 5 on the supply side of the weirs or other dividing means and the pipe 14 preferably leads to a portion of the interior of the case 5 which is partitioned from direct and intimate communication with the interior of the case 5 such as a circular well 16 supported by legs 17 and 18 with openings as shown at 19 leading liquid to the interior of the case 5. The well 16 acts as a baffle and insures a quiet liquid level within the case 5 outside of the well. Any suitable measuring element may be used for the purpose of measuring or weighing the divided portion of the liquid supplied to the meter. The term measuring element is used in this specification and the claims which follow to cover any device which may be used to ascertain the weight or volume of the liquid passing therethrough.

In the drawing I have shown a measuring device 1 of the divided bucket type comprising two measuring compartments 20 and 21 having brackets 22 and 23 extending from the sides thereof and adapted to receive shafts 24 and 25. The shafts 24 and 25 may be journaled in suitable bearings 26 and 27 secured to the sides of the shell 2. The measuring compartments 20 and 21 are separated by partitions 28, 29 and 30. A portion of the partition 29 is parallel to the axis of the shafts 24 and 25, and the upper edge of the portion 29 of the partition is adapted to swing below the discharge end of the pipe 12 so that in the position shown in Fig. 1 with measuring compartment 20 in its upright position, measuring compartment 20 will be filled with liquid issuing from the lower end of pipe 12. The proportions of the measuring compartments 20 and 21 are such that when the measuring compartment 20 becomes filled with liquid the measuring element revolves in a clockwise direction until the buffer 31 strikes upon the arm 32, Fig. 2, extending from the shell 2 causing the liquid in the measuring compartment 20 to be spilled from its discharge end 78 into the storage chamber 76. This movement of the measuring element 1 brings measuring compartment 21 to its upright position and the partition 29 swings under the end of the pipe 12 causes liquid to be delivered to compartment 21 where a similar operation is repeated, the measured liquid passing from discharge end 79 of measuring compartment 21 to the storage chamber 76 below.

The measuring element 1 is shown with measuring compartment 20 in its upright position with a buffer 33 resting on an arm 34 suitably connected to the shell 2. The arm 32 is shown in Fig. 2 and may be constructed in a similar manner. A suitable counter 72 may be secured to the outside of the shell 2 by means of supports 73 and 74, and may have a stem 69 extending through the shell. The stem 69 is received in a suitable stuffing box 75 which allows movement of the stem 69 while at the same time retaining pressure or vacuum within the shell. A suitable arm 70 extends from the stem 69 and engages a pin 71 attached to an arm 68 secured to the bracket 22 so that the counter is caused to register as the measuring element 1 delivers liquid to the storage chamber below. As the counter registers the unit charges delivered by the measuring element and as the volume or weight of the unit charges are known the quantity of water measured by the measuring element 1 is readily ascertained. The measuring element 1 is therefore adapted to measure all of the liquid passing from the pipe 12 which is a definite portion of the total liquid delivered through the inlet 15 and which bears a ratio to the total amount of liquid which depends upon the shape and sizes of the notches or weirs in the upper edge of the circular shell 7. The number or the shape and size of the notches or weirs may be such as to give any desired proportion. For example, they may be of such number and size that one-tenth of the total liquid delivered to the inlet 15, will pass through the notches 10 and 11 and passing through the pipe 12 to the measuring element 1, will be measured and delivered to the storage chamber 76 below, while nine-tenths of the liquid may pass through the other notches and pass through the pipe 13 to the storage chamber without being actually measured. If the measuring element 1 is properly calibrated so that this one-tenth of the amount of liquid which has been delivered to the machine is known, then the total amount of liquid is 10 times this amount. If the notches are proportioned as just described and the device is constructed in this manner, a measuring element having only one tenth of the capacity which would normally be required, may be used, from which it will be seen that the size of the whole apparatus may be materially reduced, thus occupying less floor space and requiring less head room for its operation. There are several advantages resulting from this arrangement, if the head room or vertical height through which the liquid passes without doing work is reduced, power is saved; as the size of the whole device is decreased, the amount of heat radiated when measuring hot water is materially reduced, and in addition to the saving of power and heat the cost of manufacturing is also reduced. The water or other liquid delivered to the meter is therefore brought together again in the storage chamber 76 and is finally delivered from the meter through any desired outlet connection as shown at 77, Fig. 1.

When the liquid meter is used for measuring liquid under pressure, a suitable air-compressor 35 may be used for supplying air or other fluid to the meter. In the drawing, I have shown a vertical steam driven air-compressor having a steam cylinder 36 and an air-cylinder 37 for compressing air or other fluid. Steam is delivered to drive the air compressor through any suitable pipe line 38 which may have a balanced valve 39 therein. The exhaust steam is delivered from the steam cylinder by the pipe 40. A ball float 41 within the shell 2 controlled by the liquid level within the storage chamber 76 may be used to automatically stop and start the compressor. The ball float 41, is connected to a float rod 42 extending through a suitable stuffing box 43 in the shell 2 and the rod 42 operates through a suitable lever 44 and link 45, to raise or lower an arm 46 which operates the balanced valve 49. The connections are made so that the balanced valve 39 is opened thus causing the air compressor to operate when the water level within the storage chamber reaches the maximum height desired, while the balanced valve 39 is closed when the water level within the storage chamber reaches the lowest point desired. Air may be received from the atmosphere through the pipe 47 and delivered through the pipe 48, check valve 49 and pipe 50 which may connect to the shell 2 or have other suitable connections so that the air delivered will be supplied to the measuring element above the storage chamber. In some cases, the admission of air to the pressure tank may be undesirable as the oxygen contained in the air may cause the shell to corrode if made of steel as is usually the case and, also, any oxygen which may be taken up by the water or other liquid being measured might cause other metals with which it came in contact to corrode. In my invention, I therefore, provide means for eliminating the undesirable constituents of the fluid delivered to the meter and while any suitable means may be employed, I have shown such a means in Fig. 1 which may be connected in the air inlet pipe 47. This oxygen removing means may consist of a suitable vessel 51 in which is placed, for example, iron filings, while the whole vessel may be heated by any preferred means such for example, as electric resistance, the wires 52 and 53 being adapted to lead electric current to the vessel 51. Any air taken by the air compressor passing through the pipe 47 to the vessel 51 will come in contact with the hot iron filings which will by their oxidation take up the oxygen so that practically nitrogen only, will be delivered to the meter and as no oxygen is delivered the device will not corrode; and further, no oxygen can be taken up by the water or other liquid passing through the meter.

When the meter is used under vacuum or pressures less than atmospheric pressure, I preferably use an air inlet valve for supplying air or other fluid to the meter. The air inlet valve may be attached to the shell and may comprise a body 54 and a valve needle 55 secured to a rod 56 having a float 57 at its end. The rod 56 is pivoted at 57 so that when liquid reaches the desired level, the float 57 will rise, lift the valve needle 55 from the valve body 54 and allow air to pass into the meter.

In Figs. 3 and 4 I have shown constructions of weirs other than V-notches which may be used for proportioning the liquid supplied to the measuring element below. In these figures I have shown four weirs, two large weirs 59 and 60 allowing the greater portion of the liquid to pass to the bottom of the shell 7 from whence it is delivered by the pipe 13 to the storage chamber below. Two smaller weirs 61 and 62 deliver liquid to the trough 9 from whence the liquid passes through the pipe 12 to the measuring element below. The weirs may be made having movable pieces such as 63 and 64 attached to the side of the shell by means of thumb nuts 65 and 66 if desired, the pieces 63 and 64 being provided with slots; the slot 67 in the piece 65 being shown in Fig. 3. By moving the pieces 63 and 64 the weirs delivering liquid to the trough 9 may be adjusted so that the weirs 61 and 62 may be made of smaller or greater proportions as desired, thus altering the proportion of liquid delivered to the trough 9 available to pass through the pipe 12 to the measuring element. By measuring the proportions of the weirs the exact proportion of the liquid passing through the measuring element may be obtained from well known laws governing the flow of liquid over weirs, notches or through orifices or the proportions of the liquid flowing may be obtained by test.

It is evident that any preferred form of liquid measuring or weighing machine desired may be used in place of the measuring device shown or any suitable weir box having V-notches, weirs or orifices may be used to measure the liquid delivered by the pipe 12, while it is also evident that great variations may be made in the construction of the proportioning means and the means used to eliminate the objectionable constituents of the air or other fluid delivered to the meter. I do not therefore confine myself to the constructions set forth.

What I claim as my invention and desire to protect by Letters Patent is:—

1. In combination with a liquid meter, a proportioning member for dividing a stream of liquid and for delivering a portion of the liquid to the meter, said proportioning member comprising a suitable case adapted to receive liquid, a shell within said case, the shell being provided with weirs, a trough within the shell and adapted to receive the liquid issuing from some of the weirs, means for delivering liquid from the trough to the meter and means for delivering the remaining liquid away from said shell.

2. In combination with a liquid meter a proportioning member for dividing a stream of liquid and for delivering a portion of the liquid to the meter, said proportioning member comprising a suitable case adapted to receive liquid, a shell within said case, the shell being provided with weirs, a trough diametrically opposed across the shell and adapted to receive liquid from some of the weirs at each end of the trough, means for delivering liquid from the trough to the meter and means for delivering the remaining liquid from said shell.

3. In a liquid meter, a measuring element closed from communication with the atmosphere, means for dividing the liquid supplied, means for delivering a divided portion to the measuring element, a storage chamber in communication with the measuring element, means for delivering the measured liquid from the measuring element to the storage chamber and means controlled by the level of the liquid in the storage chamber to admit other fluid to the measuring element.

4. In a device of the character described, a measuring element, closed to the atmosphere, a storage chamber in communication with the measuring element, a liquid receiving tank, means forming a weir in communication therewith for the purpose of dividing the liquid received, means for delivering a portion of the liquid to the measuring element and means controlled by the liquid level in the storage chamber to admit other fluid to the measuring element.

5. In a device of the character described, a measuring element, closed to the atmosphere, a storage chamber in communication with the measuring element, a liquid receiving tank, means forming a notch in communication therewith for the purpose of dividing the liquid received, means for delivering a portion of the liquid to the measuring element and means controlled by the liquid level in the storage chamber to admit other fluid to the measuring element.

HARLEY C. ALGER.

Witnesses:
 JAMES J. HUNT,
 I. E. DISCHINGER.